United States Patent [19]
Juaire et al.

[11] Patent Number: 4,574,025
[45] Date of Patent: Mar. 4, 1986

[54] METHOD OF FORMING AN END PANEL FOR A BUILDING AND DOOR UNIT

[75] Inventors: Phillip R. Juaire, Brooklyn Center; Fredric M. Wagner, Rogers; Leo F. Wildgen, Bloomington, all of Minn.

[73] Assignee: Satellite Industries, Inc., Minneapolis, Minn.

[21] Appl. No.: 566,582

[22] Filed: Dec. 29, 1983

[51] Int. Cl.[4] .............................................. B32B 31/18
[52] U.S. Cl. .................................... 156/245; 156/256; 156/258; 156/285; 52/204; 52/206
[58] Field of Search ............... 156/245, 256, 258, 285; 52/204, 206

[56] References Cited

U.S. PATENT DOCUMENTS

| | | | |
|---|---|---|---|
| 3,546,038 | 12/1970 | Smith | 156/245 |
| 3,935,358 | 1/1976 | Wyeth et al. | 156/245 |
| 4,067,163 | 1/1978 | Hetman | 156/285 |
| 4,450,661 | 5/1984 | Whitener | 52/206 |

*Primary Examiner*—Caleb Weston
*Attorney, Agent, or Firm*—John C. Barnes

[57] ABSTRACT

A wall panel for a building may be formed by twin sheet vacuum form molding an entire end panel which may then be cut to form an access opening which may be closed with the removed portion forming the door with the cut panel reassembled to form the building wall and door frame. A novel closure and lock secures the door.

4 Claims, 8 Drawing Figures

METHOD OF FORMING AN END PANEL FOR A BUILDING AND DOOR UNIT

BACKGROUND OF THE INVENTION

1. Field of the Invention

This invention relates to an improved method of forming a building panel, and particularly in forming the building panel including the door and access opening and, in one aspect, to a completed door panel unit including the wall members, the door frame, door, closure, and lock unit.

2. Description of the Art

The present invention relates to an improvement in the method of forming a building panel or wall unit for a portable building and to provide the wall unit and door with sufficient rigidity to form a serviceable longer-lifed unit. While vacuum molding has been utilized for the forming of large molded plastic or polymeric parts and that twin sheet forming of parts is known in the industry, the formation of a large twin sheet part to form a wall unit for a portable building structure and to form the unit having the access opening such that the part may be cut to form the opening and assembled to form a frame to utilize the cut piece as the door for the access opening is not known in the art and provides a very economical process for the manufacture of such wall panels.

In this invention the two sheet molding process is utilized to provide, a single molded panel from which cooperating parts are formed which, in combination, provide the wall unit and door with continuity in color and texture and will allow the inside to be of a different color and thickness from the outside.

The wall unit of the present invention provides its own rigidity to remove the need for supporting braces which were added to previously known polymeric wall panels formed by vacuum forming processes. Further, the shape of the outer and inner walls may be dedicated to their individual end use without compromising the shape of the other.

SUMMARY OF THE INVENTION

This invention relates to a new process for the formation of a building panel or wall unit comprising the steps of heating and vacuum forming a pair of mating sheets of polymeric material, bringing the sheets in their molds while still heated into pressure contact to secure the sheets together in their contacting areas, separating the molds and removing the panel, cutting from the panel a door unit and cutting the remaining panel, preferably into two generally equal portions, moving the portions toward one another to place portions thereof in overlapping contact position, securing the same in the overlapped areas, and replacing the door unit in the area from which it was cut where it will now contact the repositioned portions which form a frame for the door. Hinges are secured to the door and one of the panel portions and a door closure and a lock unit for the door can be affixed thereto. The closure comprises a long life return member which will urge the door to the closed position and the lock unit affords a rotary lock and lock position indicating device which is visible from the outside.

BRIEF DESCRIPTION OF THE DRAWINGS

The invention will be described in detail with reference to the accompanying drawing wherein.

DESCRIPTION OF THE PREFERRED EMBODIMENTS

The present invention provides a fast economical process for the production of a building panel unit having built-in reinforcement to make the panel substantially self supporting. The process comprises the use of a pair of large 5'×9' vacuum form molds which are each provided with a molding face to receive one sheet of polymeric material which may be drawn against the molding face to form the shape desired in the presence of heat. A first mold forms the sheet defining the outer skin for the panel unit and a second mold forms a sheet defining the inner skin of the panel unit. The two sheets are formed in the molds and are then placed, when still in the heated condition, in contact with each other to bond, in the areas of contact, the two sheets together rigidly.

Figure 1:
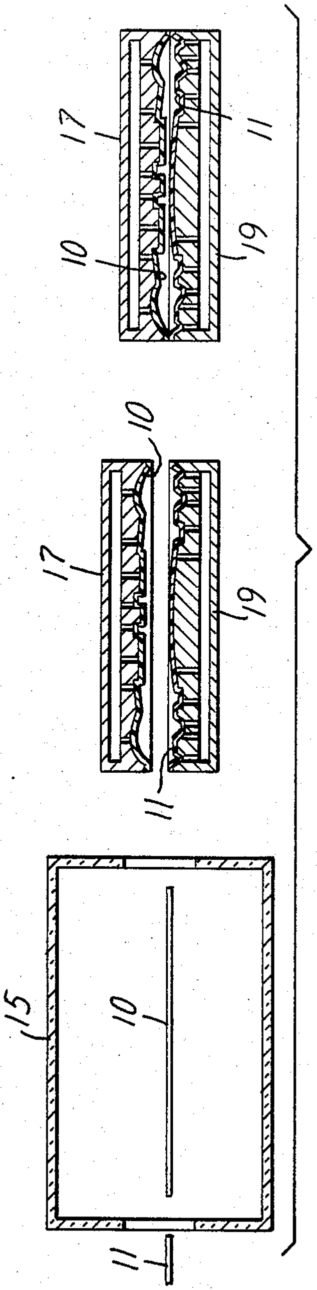
FIG. 1 is a schematic diagram of the steps for the production of the building panel according to the present invention.

Referring now to FIG. 1 it will be seen that sheets are first moved successively, as by a conveyor frame, not shown, which conventionally grasps the sheets 10 and 11 by clamps positioned along opposite edges to advance the sheets, through an oven 15 where the sheets are heated. The sheets are then moved to a position against a mold 17 or a mold 19, respectively, which molds are formed to draw the heated sheets against the face of the mold under the force of subatmospheric pressure on one side with the atmospheric pressure against the other to make it conform to the mold face. The molds are then moved into contact with each other, as illustrated on the right side of FIG. 1, to place portions of each of said sheets into contact with each other while still in the heated condition. Placing the sheets in contact while heated sufficiently to permit a flow of the polymeric material under pressure causes the contacting areas of the two sheets to be firmly bonded together to thus form the panel generally designated 20, illustrated in FIG. 2.

The sheets 10 and 11, as they move into the oven 15, are 5' by 9' in size and are preferably formed of a poiyethylene material.

Figure 3:
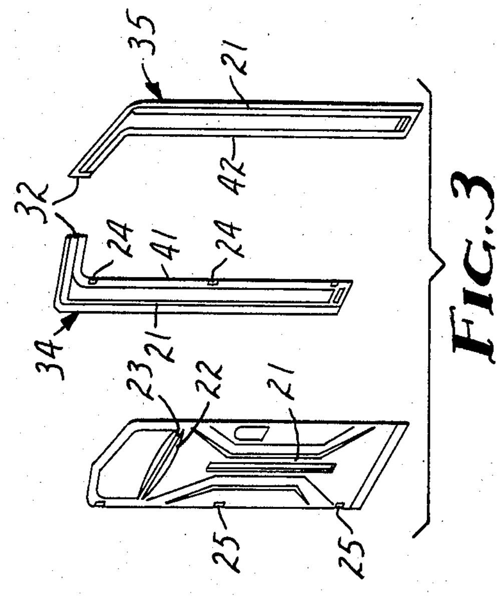
FIG. 3 is an exploded view of the parts upon cutting the panel.

The panel 20 is cooled and a rigid structure results which is formed as hereinabove described with a series of raised ribs 21, arcuate surfaces 22 and transverse rib members 23, as illustrated. The panel is then cut along the line indicated by dots at 30 to remove from the panel a central section 31, as shown in FIG. 3. The removal of the central section then leaves a generally inverted U-shaped portion. The U-shaped portion may be cut at 32 between the cut line 30 of the central section and one marginal edge to form two additional sections 34 and 35. The sections or portions 34 and 35 are moved to bring opposite edges of said sections, remaining upon the cutting of said central section, toward one another such as to reduce the width of the cutout area to define a frame for the section 31. This cut along the dotted line 32 separates the portions 34 and 35 along offset areas of the panel formed with sheets 10 and 11 in contact.

Figure 2:
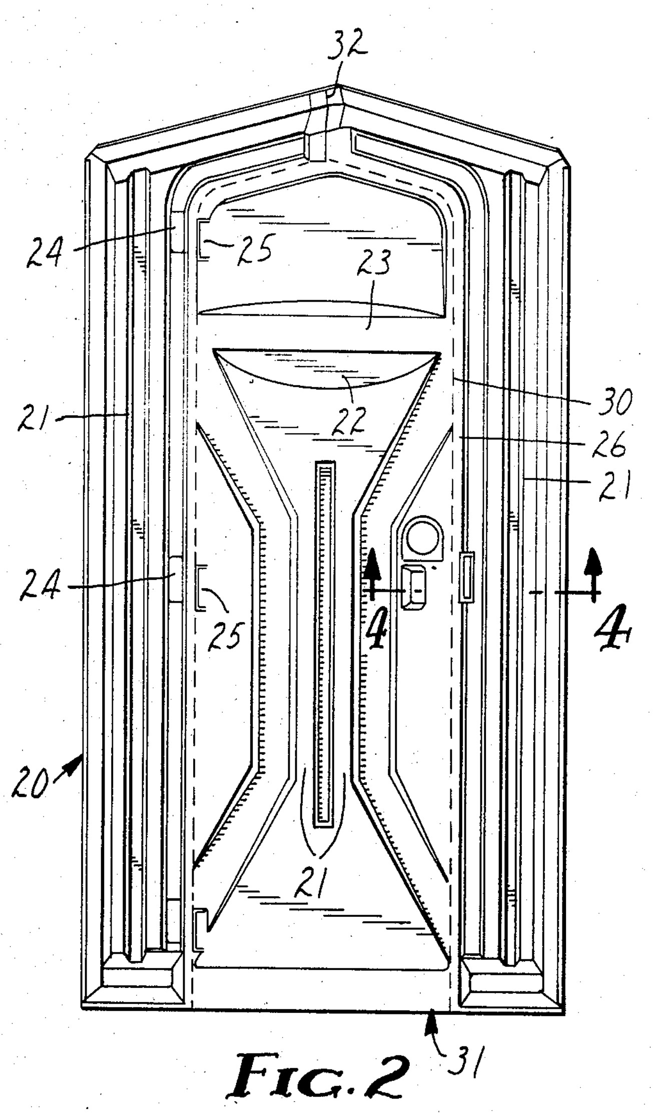
FIG. 2 is a front elevational view of a panel unit as it is removed from the production line illustrated in FIG. 1.
Figure 4:
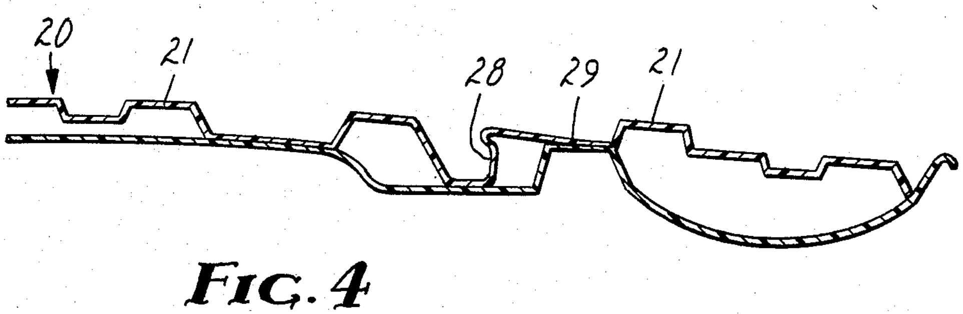
FIG. 4 is a horizontal sectional view taken on line 4—4 of FIG. 2.
Figure 5:
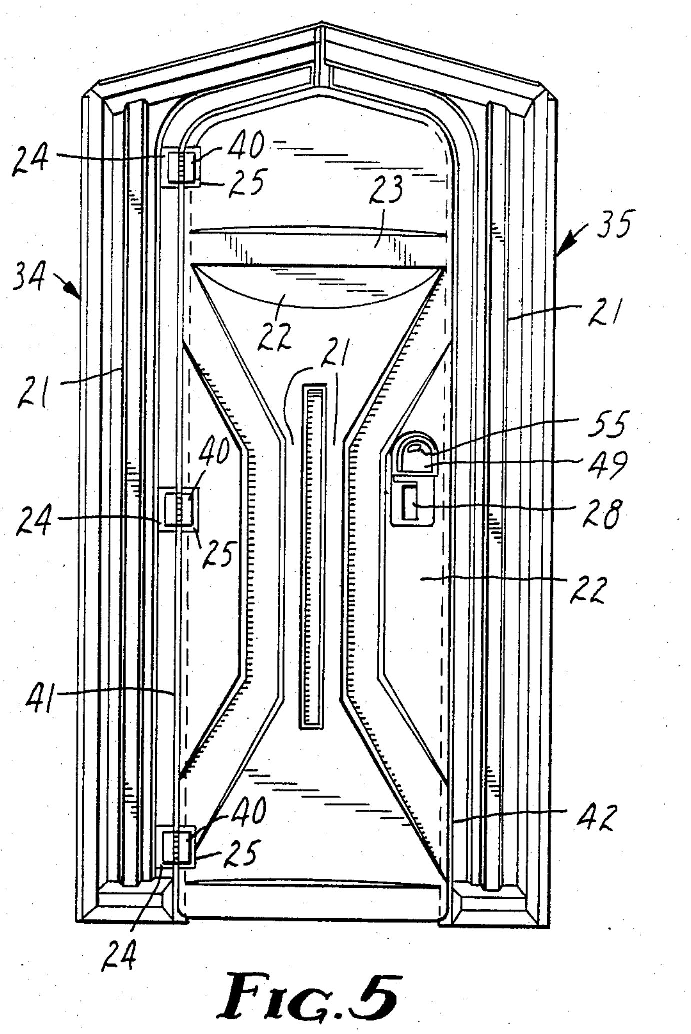
FIG. 5 is a front view of the panel unit with the door fixed by hinges in position in the panel unit and with the closure member in place and the lock unit on the door.
Figure 6:
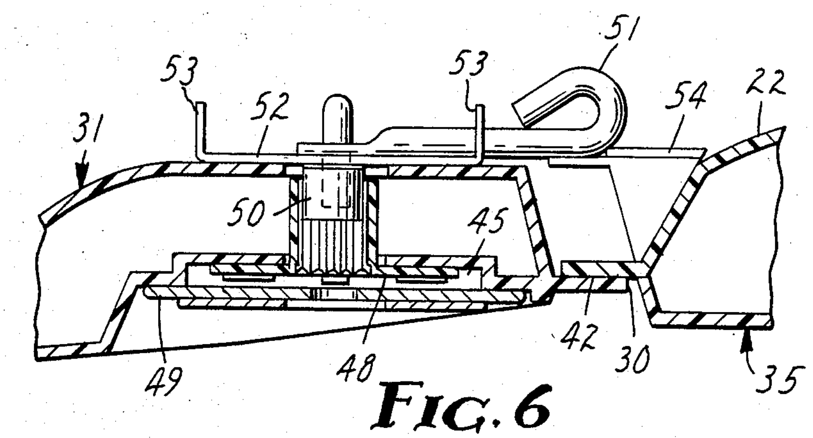
FIG. 6 is a horizontal sectional detail view of the door lock unit.

As shown in FIG. 2, support pads 24 and 25 of each pair are vertically offset from one another but, upon reassembly of the portions 34 and 35, and section 31, after making the cuts described above, the pads 25 are aligned with the pads 24 such that the opposite plates of each hinge 40 may be readily mounted in opposed position, see FIG. 5. In FIG. 4 the panel is shown in cross section and the section is taken to illustrate a recessed area 28 defining a hand hold for pulling the door unit open and the bonding of the sheets at 29 where the cut 30 is made.

As shown more clearly in FIG. 5, the portion 34 and the portion 35 are moved into overlapping position adjacent the cut line 32 of each of the panel portions and are then secured together again by suitable fastening means such as bolts or pop rivets. The overlapping amounts to movement of one portion approximately $1\frac{1}{2}$ inches to move the opposed edges of the two panels closer together such that an edge 41 on the panel portion 34 and an edge 42 on the panel portion 35 form the edges of the frame for the door unit 31. The door is moved upward into the frame approximately 1 inch such that the bottom portion of the overlapping portions adjacent the cut 32 define the frame for the upper portion of the door.

The door is then mounted by hinges 40 supported on the pads 24 and 25 to the panel 34, and the building of the door panel unit continues.

The door is then fitted with a lock unit which is mounted in a recessed portion 45 on the front or outer face of the panel 31 and has the latching handle 51 at the rear or adjacent the inner panel. The lock unit comprises a rotary disc 48 which is positoned in the recess 45 and which is placed beneath a cover plate 49. The disc 48 has a hub with a central opening to receive a spindle 50 fixed to the latch handle 51. On the back side of the panel 31 is mounted a latch plate 52 rotatably supporting the latch handle 51 and having a pair of ears 53 which limit the rotation of the latch handle 51 and the disc 48. The latch handle 51 comprises a handle portion extending radially from the central axis or stub shaft thereof, and a counterweight extends radially from the handle portion to position the handle freely in an unlatched position. The handle can be rotated from the unlatched position to the latched position wherein it is frictionally held against a keeper 54 which is bolted or riveted to the back side of the panel 35 adjacent the frame portion 42. The keeper 54 has a stepped portion to position the handle in a closed frictional latched position. The disc 48 is provided on its front face with indicia and color image areas such that when the unit is unoccupied the disc will display "open" being the open sign and a green surface, and when the unit is occupied with the latch handle 51 in the latched position, the disc will display the words "in use" and a red color, through the window or transparent area 55 in the upper portion of the covering panel 49, see FIG. 5. The red and green colors are selected from fluorescent colors to be visible from over 200 feet.

Figure 7:
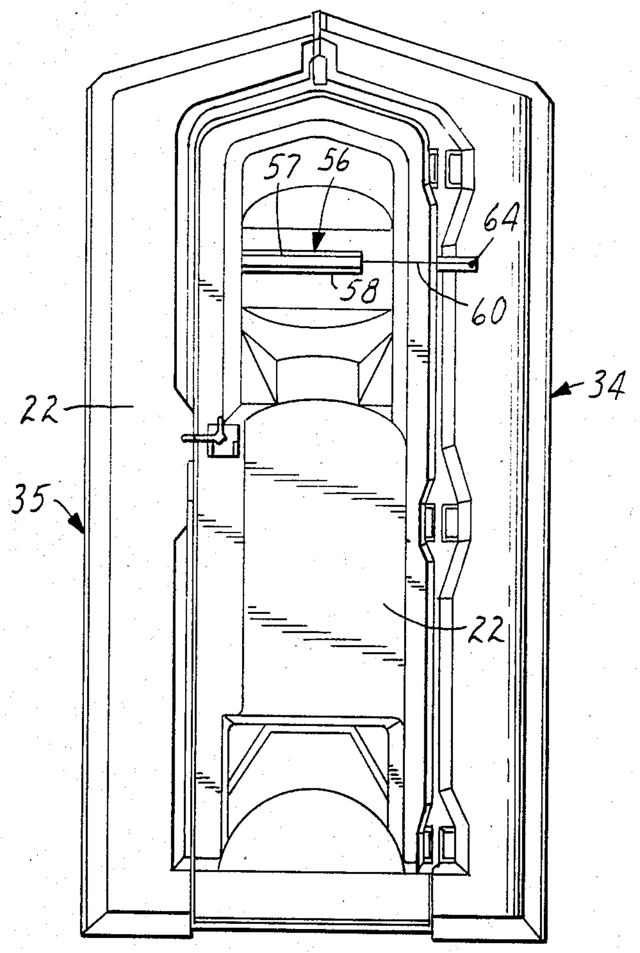
FIG. 7 is a rear view of the panel unit with the door in place and illustrating the closure unit.
Figure 8:
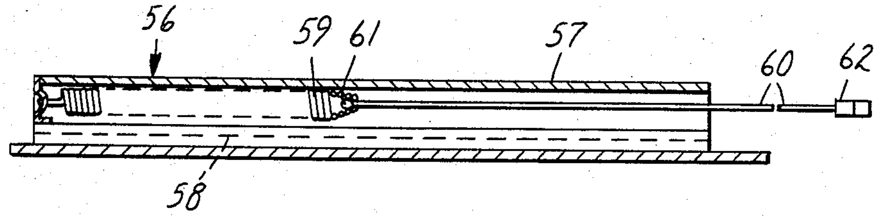
FIG. 8 is a detail sectional view of the closure unit.

To maintain the door in a closed position against the door frame formed by the areas 41 and 42, the unit is provided with a spring closure. This closure is illustrated in FIGS. 7 and 8 and comprises a housing 56 which is formed with a cylindrical portion 57 joined by two oppositely extending flange portions 58 which are secured to the back side of the central section or door 31. In the cylindrical portion 57 is a bore in which is positioned a helical spring 59 which is anchored at the left end as illustrated to the housing 56. A cable is threaded through the center of the helical spring. The cable 60 is formed at one end with a ball or keeper 61 having a diameter larger than the end of the tapered end of the spring 59. The opposite end of the cable 58 is provided with a anchoring member 62 to connect or anchor the cable into a plate 64 which is secured to the panel 34 of the unit. The bracket 64 is formed with a smooth bend intermediate its ends to carry and contact the cable as the door is opened, but which, because there is no relative sliding movement, protects the cable and provides a fulcrum point for the closing of the door. The closing unit as described is substantially free from vandalism as the portions of the spring and cable are well protected.

Having thus described the present invention it is to be understood that changes may be made without departing from the scope or spirit of the present invention. It is envisioned that the panel unit, prior to the cutting steps, could be formed by blow molding the panel because the technology is now such that large pieces of this type can be used. In such a blow molding operation a parison is first extruded which is a cylindrical shape of material which goes down between the mold halves forming the mold panel and then the cylinder is blown against the opposing mold faces with internal air pressure. The mold faces are brought together to form the completed product wherein one layer of material forms the outer skin of the panel and another layer forms the inner skin of the panel with the panels joined tightly together.

Other modifications might be made in the present invention without departing from the claims as appended hereto.

We claim:

1. The method of forming a wall for a building in which a door is mounted comprising the steps of
forming a first panel in a mold,
forming a mating second panel in a mold,
placing said molded panels in mating engagement while said panels are heated at a temperature to bond said panels at areas of mating engagement,
cooling said bonded panels to define a rigid structure,
cutting a central section from said rigid structure along an area where said panels were bonded together to define at least three edges of a door,
cutting the remaining portion of said rigid structure from said central cut area to an edge of said rigid structure where said panels were bonded to cut said remaining portion into two sections,
sliding the sections together along the last-mentioned cutting to overlap said sections along the cut edges, and
joining said sections at said overlap to move opposite edges of said sections remaining upon cutting said central section to form a frame for said central section defining the door.

2. The method according to claim 1 comprising the step of mounting the central section to one of said opposite edges by means of hinges.

3. The method according to claim 2 comprising the step of fitting said central section with a lock unit.

4. The method of forming a wall for a building in which a door is mounted comprising the steps of forming in a mold a polymeric panel having a front skin and a back skin, a series of raised ribs, arcute surfaces and areas where the front and back skins are bonded together, cutting a central section from said panel along an area where said front and back skins are bonded together to define at least three edges of a door, cutting the remaining portion of said panel from said central cut area to an edge of said panel where said sheets were bonded to cut said remaining portion into two sections, sliding the sections together along the last-mentioned cutting to overlap said sections along said cut edges, and joining said sections at said overlap to move opposite edges of said sections remaining upon cutting said central section to form a frame for said central section defining the door.

* * * * *